COLOR TELEVISION RECEIVER

Filed Aug. 1, 1963

3 Sheets-Sheet 1

INVENTOR.
JEROME C. VON BENGE
BY Harry M. Saragovitz, Edward J. Kelly, Herbert Berl & S. Dubroff
ATTORNEYS:

INVENTOR.
JEROME C. VON BENGE
BY Harry M. Saragovitz,
Edward J. Kelly,
Herbert Berl &
S. Dubroff
ATTORNEYS:

INVENTOR.
JEROME C. VON BENGE
BY Harry M. Saragovitz,
Edward J. Kelly,
Herbert Berl &
S. Dubroff
ATTORNEYS:

United States Patent Office 3,354,263

Patented Nov. 21, 1967

3,354,263

COLOR TELEVISION RECEIVER

Jerome C. von Benge, 1513 Pittston Ave., Scranton, Pa. 18505

Filed Aug. 1, 1963, Ser. No. 299,285
6 Claims. (Cl. 178—5.4)

Figures 1, 2, 3, 4:
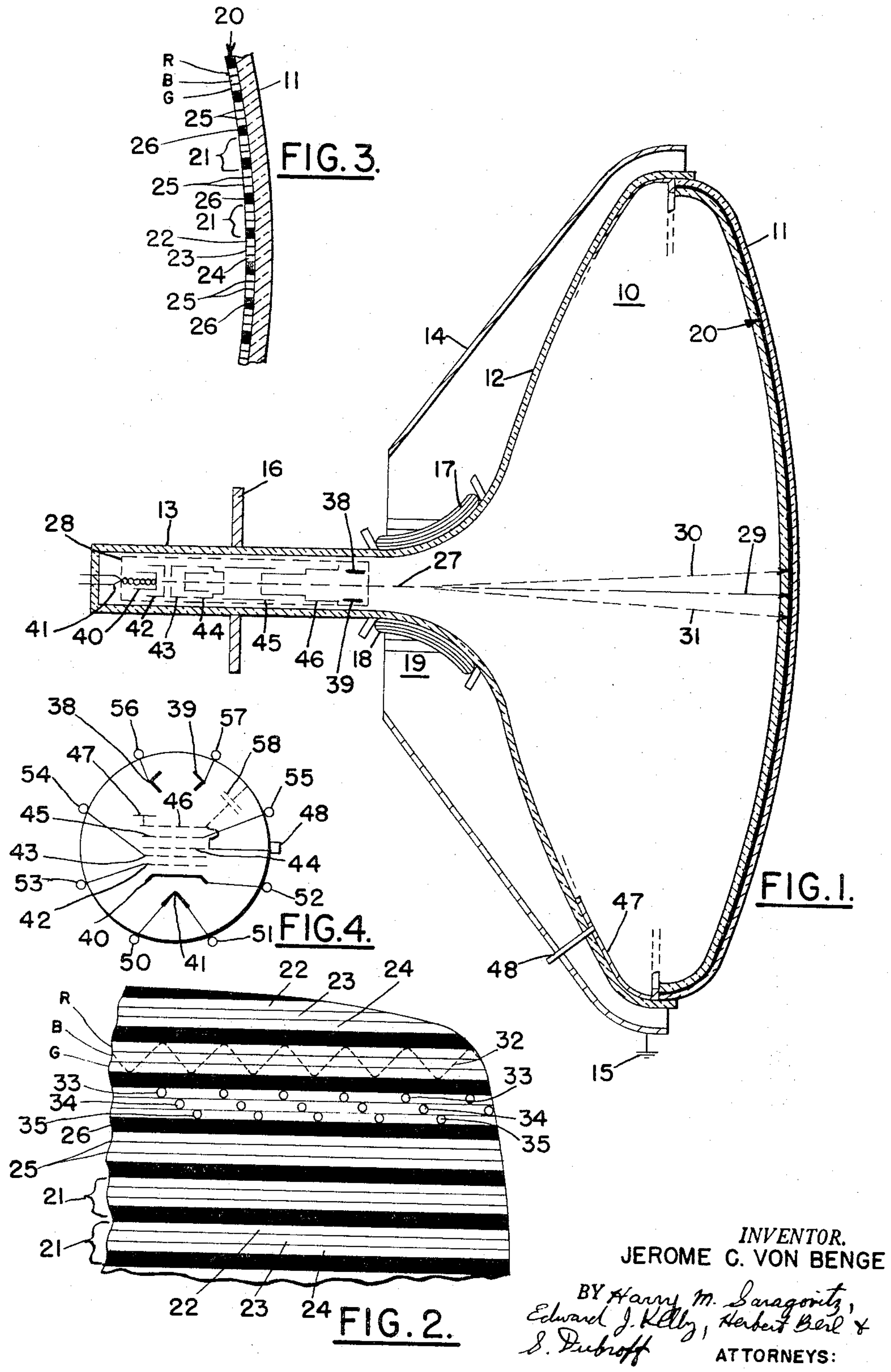

The invention described herein may be manufactured and used by or for the Government for governmental purposes without the payment to me of any royalty thereon.

The present invention relates to color television receivers and receiving systems of the type which utilize a single cathode-ray picture or display tube for the reproduction of color television scenes or fields, as pictures for viewing in natural color. More particularly, the present invention relates to television signal receivers and receiving systems of the type referred to, in which the cathode-ray picture tube is of the single-gun or single-beam type, as distinguished from the more conventional and commercially-used, three-gun or multi-beam, shadow-mask type.

Single-gun or single-beam cathode-ray tubes for viewing picture in color may be of simplified construction and are of growing commercial interest. Generally, for color picture reproduction, the tube face or screen element of proposed single-gun cathode-ray tubes is horizontally lined or laminated in beam-responsive fluorescent or color producing strips, each substantially one scanning line wide. Signal information pertaining to the colors of the system being used, such as the three primary colors, is applied successively to the beam intensity-controlling means of the tube in synchronism with the operation of conventional horizontal and vertical beam deflecting means which directs the beam to scan the strips successively in a repeating pattern down the tube face or screen element. The individual strips are activated by the beam trace to luminesce visibly each in one of the respective colors. The partial images presented by each of the individual colors are added by persistence of vision to form a composite natural color image.

A single-beam color television tube of the type referred to is described in the patent to Leverenz 2,370,863, in which the tube screen element comprises parallel phosphor lines extending transversely thereacross and providing a red, blue, and green primary color luminescence sequence, in the manner above described, as the lines are successively activated by the scanning beam.

A further consideration of color television receivers and receiving systems involving the use of such picture tubes, indicates that difficulty has been experienced in attaining the proper linearity characteristic in the beam deflection to provide accurate registry of the beam trace with each phosphor or like beam-activated strip of the tube face or screen element. This may account, at least in part, for the apparent lack of commercial use of the single-gun or single-beam cathode-ray tube for color picture reproduction.

Attempts have been made, however, to correct the linearity of the beam deflection and to overcome this and other related problems with single-beam cathode-ray color picture tubes and the laminated-type multi-color screens provided therein. One example is shown in the patent to Schultz, 2,577,368, where, in order to focus the beam with sufficient accuracy to prevent spill-over onto adjacent color lines, in any one trace, biasing electrodal elements in the screen, together with gating and biasing circuits therefor had to be added to the system. This is representative of many other examples in the prior art and indicates the complications that become involved with corrective changes of this type, and how such complications may substantially nullify the benefits sought to be attained by the use of the single-gun or single-beam tube structure for color television picture reproduction.

It is, therefore, a primary object of the present invention, to provide an improved cathode-ray color television picture tube of the single-gun type which is of simplified construction adapted for relatively low-cost mass production, and substantially devoid of beam nonlinearity and other related problems heretofore involved in a consideration of the use of such tubes for color television picture reproduction.

It is also an object of this invention, to provide an improved cathode-ray picture tube of the type referred to, and control and operating circuits therefore, adapted for use in conventional and other color television receivers and receiving systems, with only minor circuit modifiications therein.

Present color television systems generally operate on a time-sequential basis, as is known, and thus may be of the line-sequential, dot-sequential, or field-sequential type. Receivers and receiving systems to which the present invention relates are of the line-sequential type, wherein reproduction of the color components of a picture is by successive individual different color lines. This present-day system is thus well adapted for operation with single-gun picture tubes of the laminated screen type referred to.

The dot-sequential type of picture reproduction has certain advantages in that signal modulation may be applied to the picture tube in a succession of modulated dots or spot samples each much less than one scanning line long and thus provide greater picture detail and accuracy.

It is, therefore, a further object of this invention, to provide an improved cathode-ray picture tube of the single-gun type and control circuits therefore, for color picture reproduction in a dot-sequential configuration with line sequential scanning, thereby to improve the picture reproduction.

It is also a further and related object of this invention, to provide an improved color television picture tube of the single-gun type having high-frequency vertical scanning movement in the beam deflection and screen-line response in more than one color, and control means for operating such tube to provide improved picture reproduction in full natural color.

It is a still further object of this invention, to provide a single-gun cathode-ray picture tube having an improved screen structure and beam-deflecting system for operation in a tri-color, three channel, line-sequential type color television receiver or like color picture reproducing apparatus.

In accordance with one embodiment of the invention, a single-gun or single-beam cathode-ray picture tube is provided with conventional horizontal and vertical beam-deflecting means and circuits, and suitable matrixed video signals in three color channels for application to the control or signal input electrode of the tube. Three gating circuits or gates constructed and operated in accordance with the invention, are connected one with each video or color channel following the matrixing, and, through a common output mixing circuit, with the tube control or signal input electrode to modulate the beam in accordance with sampled or gated color signal information.

The tube face, that is, the image or viewing screen on or associated therewith, is divided horizontally or transversely into a large number of parallel scanning lines, such as the conventional number (525) presently used for beam movement in NTSC system, and each line may be energized by the beam scan to emit all of the colors involved in the picture transmission and reproduction to be handled by the system and the particular receiver. These may be considered to be the three primary colors, as a practical consideration and by way of example. Thus each scanning line of the screen is effective to luminesce or otherwise emit not just one but a plurality, such as three primary colors, and to do this selectively in a dot-sequential pattern in accordance with the invention. To do this the beam is directed to scan each line of the screen vertically in a relatively-high-frequency undulating or hill-and-dale path or traverse of any desired shape in a repetitive cyclic pattern of uniform amplitude for the peaks and valleys. This action is additional to the normal horizontal and vertical scanning movement of the beam, and each scanning line on the tube face or screen element consists of different and separate color-emitting fine stripes, bands, or elements which are activated by intersection with the beam trace, and may be the three primary colors referred to.

The stripes or color elements are separated slightly by interposed boundary lines of non-emitting or inert and opaque or masking material, preferably of black color, and the lines are likewise separated by interposed stripes or bands which may be of the same masking or blanking material and of the same color. These latter stripes may be considered, at one edge, to be part of the multi-color scanning line, and thus each color stripe, band, or line element, may be approximately one-quarter of the line width in each case.

Within the safeguard of the inert boundary lines or stripes, the beam is oscillated or wobbled vertically, at the relatively-high-frequency rate referred to across each line it scans and effectively in a dot-sequential manner or pattern. The amplitude of the hill-and-dale beam trace and the pattern is adjusted by suitable means. This additional beam control may be provided by the addition of suitable deflecting means, such as electrostatic deflecting plates, at the forward end of the electron-gun, which may otherwise be of the conventional high-speed, high-resolution type. The deflecting plates and the gating means of the control system are driven from the same relatively-high-frequency signal source and are therefore always synchronized. The gate means, as will be seen hereinafter, are operated in such a manner that the color information from each reaches the control electrode or signal grid in an out-of-phase relation in synchronism with the dot scan of each color element of the scan lines of the screen, to produce the composite picture.

In a single-gun cathode-ray color-picture producing system in accordance with the invention, it will be seen that an additional high-frequency vertical wave or oscillatory motion of uniform amplitude is given to the beam between the defined limits of each scan line provided on the screen, and in synchronism with the gating of the color signals and picture information to the beam. The lines are discrete and separated by the masking or blanking material as are the individual color elements or bands of each line, so that the danger of scanning overlap is reduced or substantially eliminated by the tube screen structure, and no complicated circuitry or other special means to prevent spill-over is required in the scanning systems.

The beam is subjected to the conventional horizontal and vertical scanning action to cover the screen in the usual manner, and is further oscillated as it scans the screen, and modulated with the signal information to develop the picture in a dot-sequential pattern in response to line-sequential signal transmission. Each successive sweep of the cathode-ray beam across the screen is thus a normal single scan line, but a plurality of color elements below the preceding sweep. In doing this it excites each color element effectively many hundred times with variable brightness spots or dots for a more perfect picture development, without extensive complicated circuits or other elements. Furthermore, with this system as will be seen, conventional receiver circuits may be provided for operation of the tube and its control circuits.

The invention will, however, further be understood from the following description of certain embodiments thereof, with reference to the accompanying drawings, and its scope is pointed out in the appended claims.

Figure 5:
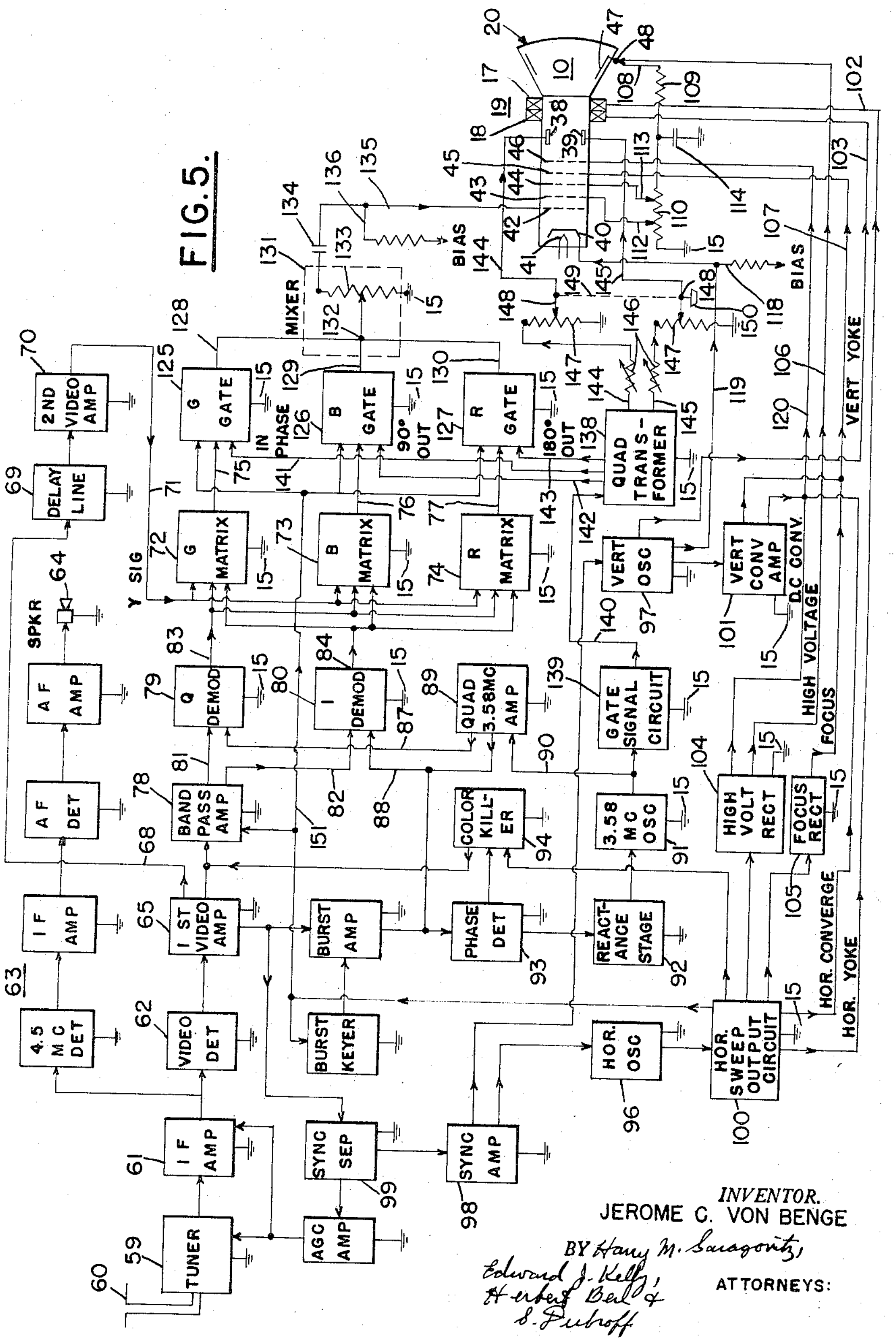
Figure 6:
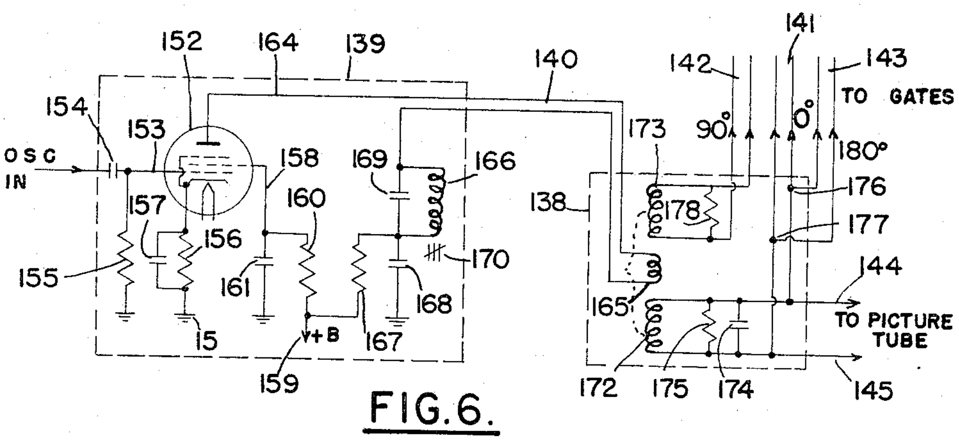
Figure 7:
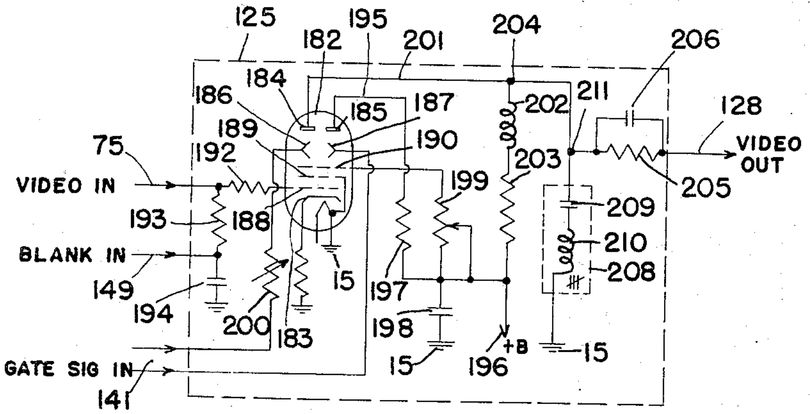
Figure 8:
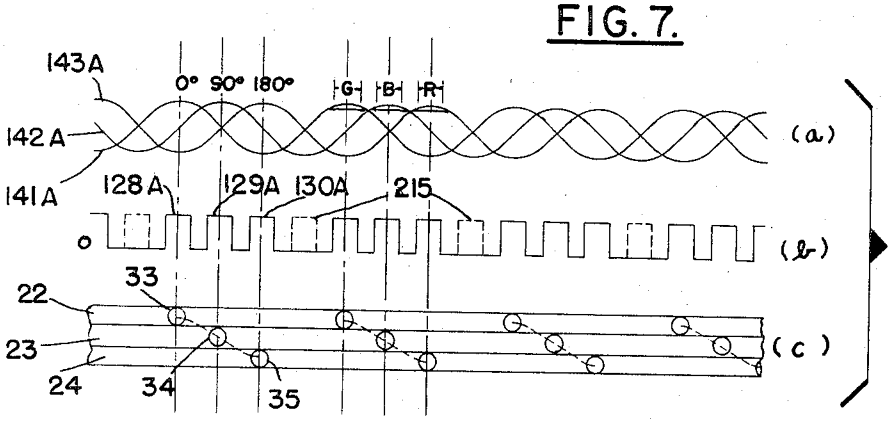

In the drawings:

FIG. 1 is a longitudinal view in cross-section, schematically showing the construction of a single-gun cathode-ray color picture tube in accordance with the invention, FIG. 2 is an enlarged fragmentary view, in elevation, of a portion of the tube face or screen element of the tube of FIG. 1 showing further details of construction thereof in accordance with the invention, FIG. 3 is a further enlarged sectional view of the screen portion shown in FIG. 2, further illustrating the construction thereof in accordance with the invention, FIG. 4 is a schematic circuit representation of the picture tube of FIG. 1, showing the base terminal configuration and connections therewith for the tube elements, FIG. 5 is a schematic circuit diagram, in block form, of a color television receiver system embodying the picture tube and control circuits of the present invention, FIGS. 6 and 7 are schematic circuit diagrams of certain portions of the tube control circuits of FIG. 5 showing the construction thereof in accordance with the invention, and FIG. 8 is a graph showing curves illustrating the operation of the circuits of FIGS. 5, 6, and 7 in connection with the tube of FIG. 1.

Referring to the drawings, in which like elements throughout the various figures are designated by like reference characters, and referring particularly to FIGS. 1, 2, and 3, a cathode-ray picture tube 10 of the single-gun or single-beam type is provided with a conventional evacuated envelope comprising a transparent tube face 11 of glass or other suitable material bonded to the bell portion 12 which, in turn, is connected with, or is integral with, a central rearwardly-extending cylindrical neck or neck portion 13. The tube preferably is provided with a suitable outer magnetic shield, such as a shield cone 14 of mu-metal for example, surrounding the bell portion 12 in coaxial relation thereto and grounded to system ground 15 as indicated. This insures stability of the electron beam path within the tube. A permanent-type centering magnet 16 surrounds the neck along with electromagnetic horizontal and vertical beam deflecting coils, indicated at 17 and 18 respectively, and included in the usual yoke structure 19 at the forward end of the neck.

The image or viewing screen 20 for the tube is formed on the inner surface of the tube face in the present example, although it may be separately formed and mounted in spaced relation to and in rear of the tube face, as is possible in any tube structure of this type. The tube face or viewing screen formed thereon is divided horizontally or transversely into a plurality of discrete parallel scanning lines 21, being as many as the conventional standard 525 lines presently used for beam movement in any commercial television broadcast system. In this way each line may be scanned by the beam trace in connection with any conventional receiver or receiver system.

Whereas, in prior single-gun picture tubes each scanning line is a single color emitting strip, here each scanning line on the screen or screen element comprises several, and in the present example, three different and discrete color or color-emitting stripes, bands or elements 22, 23, and 24 of substantially equal width extending along the line in parallel relation. The scanning lines of the screen are thus composite strips and any number of color stripes, bands, or elements may be provided, in any case, to permit each line to emit all of the colors involved in the picture transmission and reproduction to be handled by the system in which it is used. In the present example, only the three primary colors, red, green, and blue, may be considered to be emitted by each scanning line 21 from the elements 22, 23, and 24, respectively, in response to the beam trace intersecting therewith, as will hereinafter be described.

The stripes or color elements in each line are separated slightly by interposed boundary or separator elements 25 of non-emitting or inert non-reflecting, insulating material, preferably of black color. The lines effectively are likewise separated by interposed stripes, bands, or line separator elements 26 which may be of the same material and color as the color separator elements. Each of these latter separator elements may be considered to be part of a multi-color scan line along one edge thereof as indicated in FIGS. 2 and 3. Thus each color stripe, band or element 22, 23, or 24 is slightly less than one-quarter of the width of the scan line in which it is located.

The image screen of the picture tube of the present example is thus made up of fluorescent or like color-emitting stripes in trios for operation in the primary colors, with one stripe for each of the colors, red, green, and blue, in each trio. Each stripe is separated from its neighbor by a narrow separator element or stripe of masking or blanking material as described, to increase contrast, reduce reflection, and isolate the color stripes. Each trio of color stripes and separator elements is separated from the others by somewhat wider separator elements or stripes 26. One of these together with the trio of color stripes and separator elements, makes up each scan line on the tube face or image screen. With a line scan of 525 lines, there are thus over two thousand stripes, most of which the scanning beam must cross or intercept for each picture frame.

In the larger picture tubes, the blanks or separating elements 25 between the color stripes preferably are gradually widened as the scanning lines in the screen approach the edges thereof, while the separating stripes 26 in each line, or between the color trios, are gradually narrowed accordingly, thereby to keep the center of each trio in proper relation to the others, or to maintain the scanning line spacing and width, while compensating for the longer path of the electron beam at the corners or remote boundaries of the frame. In other words, the color stripes widen as they approach any edge and are the widest at the corners of the screen, where the electron beam is widest.

The picture thus comprises a plurality of extremely narrow fluorescent or like color emitting stripes arranged in scanning lines. In the present example, every third stripe in each line produces the same one of the primary colors when stimulated by the beam trace. The stripes are less than one-quarter of the width of a scanning line in black-and-white in the same size tube. A group of three color stripes or bands, plus the separator stripe or band, is equal to the line width referred to and capable of producing any color in the spectrum within that space. Since the color stripes are extremely fine or narrow, an extremely small electron beam indicated at 27, capable of a 2000-line resolution or better is provided by the single gun, indicated in dotted outline 28 in the tube 10. The normal deflection system, including the coils 17 and 18 in the yoke 19, is capable of producing an image with normal linearity, that is, little or no vertical linearity error.

To produce the desired color pattern for developing the picture, the beam 27 is caused to oscillate or deviate from its normal path or direction, indicated by the dot-and-dash line section 29, vertically between limits as indicated by the dash-line positions 30 and 31 of the beam, as it scans each line containing the three color stripes. Since it is thus moving transversely and vertically at the same time, it describes a repetitive wave pattern or path across each trio of color stripes in each line, as indicated, for example, by the dotted sine-wave pattern 32. As will hereinafter be described, the color signals are gated to the electron gun or control means for the beam in synchronism with the beam deflection or position in the sinusoidal path 32, and thereby producing a regular sequence of variable-brightness beam spots or dots indicated at 33, 34, and 35 in each line, to form the composite color image.

The electron gun 28 may generally be of the conventional high-speed, high-resolution type except for the additional beam-deflecting means. This may include a pair of electrostatic beam-deflecting plates 38 and 39 at the forward end of the gun and spaced above and below the beam path 27–29 as indicated, thereby to impart the additional vertical deflection movement, 30–31, thereto in response to applied signals. In order to produce the picture definition and close dot pattern desired, these signals must be provided at a relatively high frequency in any case, preferably in the megacycle range, and may be derived from any available source such as the color subcarrier oscillator at 3.58 mc. in the usual conventional color receiver system.

In addition to the two electrostatic plates, 38 and 39, which guide the electron beam 27–29 in its undulating path along each scan line and group of color stripes, the gun 28 may be considered to include a cathode element or cathode 40, a heater element 41 therefor, a first control electrode or grid 42, a second control electrode or screen grid 43, a third electrode or accelerating anode 44, a fourth electrode or focusing anode 45 located in association with the exterior focusing magnet means 14, and a fifth electrode which may be a beam converging first anode or convergence electrode 46, all coaxially arranged along the beam or tube axis as indicated. The high-voltage ultor or second anode is indicated at 47 in connection with its high-voltage terminal 48. A suitable getter (not shown) is included in the tube structure to provide the usual protection for the screen from ion bombardment.

The picture tube may be provided with conventional base and socket terminal means arranged for connection with the various tube elements as shown in FIG. 4, to which attention is directed along with the preceding figures. As schematically indicated, the heater element 41 is connected to the first and eighth base terminals 50 and 51. The cathode 40 and control grid 42 are connected respectively with the seventh and second base terminals 52 and 53. The second grid 43 and the focusing anode 45 are connected respectively with the third and sixth base terminals 54 and 55, while the beam deflecting plates 38 and 39 are connected respectively to the remaining fourth and fifth base terminals 56 and 57. In some applications of the picture tube of the present invention, the ultor or second anode 47, as here shown, may be connected internally in common with the third and fifth electrodes 44 and 46, to its high-voltage outer terminal 48. The distributed capacity of this electrodal combination to ground conducting elements of the tube structure is indicated by the dotted capacitor 58.

The substantially-standard base construction shown may be used for better adapting the tube for mass production and connection with conventional color television receivers without extensive circuit changes. However other terminal arrangements may provide separate external circuit connections for additional anodal and other electrodes if desired. Circuit connections adapted for this type of base construction are shown for example in FIG. 5 where the picture tube 10 of FIGS. 1, 2, and 3 is connected and operated in accordance with the invention in a conventional color television receiver or receiver system with a minimum of circuit change therein.

Referring particularly to FIG. 5, the receiver system shown is representative of the type with which the picture tube and control circuits of the present invention may readily be used. It comprises signal-channel selecting or tuner means 59 connected with a suitable antenna 60. The tuner may include the usual R–F amplifier, mixer and oscillator elements for delivering the I–F picture signal to the multi-stage I–F amplifier indicated at 61. This is followed by the second or video detector 62, and the sound channel 63 of the receiver including the output or loud-speaker means 64. Any suitable sound channel may be provided. The output signal from the video detector 62 includes the luminance component and the chrominance component with its color subcarrier signal and side bands, and is applied to the luminance and chrominance channels of the receiver through the first video amplifier 65.

The luminance or Y-signal channel from the first video amplifier 65, includes a signal circuit connection 68, through the usual delay-line means 69 and the second video amplifier 70, to an input signal circuit connection 71 with each of the three color matrix sections of the receiver as indicated by the blocks 72, 73, and 74. These may be identified by way of example as the Red, Green, and Blue matrix sections in the present receiver system. Each color matrix may be assumed to include the usual color adder and D–C restorer, and an output channel or circuit, as indicated at 75, 76, and 77 for the respective matrix sections 72, 73, and 74. These are normally connected with the tri-color three gun elements of the usual or conventional three-gun or three-beam color picture tube of the system. In the present system, as modified in accordance with the invention, these signals are gated and mixed and applied to the single gun element 28 of the tube of FIGS. 1, 2, and 3, as will appear.

The chrominance channel from the first video amplifier, extends through a color bandpass amplifier 78 and to two color demodulators 79 and 80 through signal supply connections indicated at 81 and 82 respectively. The demodulator output signals are applied to all three matrix sections in parallel relation through suitable signal supply circuit connections indicated at 83 and 84. In these, it should be understood, certain of the usual circuit components are here omitted for the sake of simplifying the drawing and the description, since only the color circuits or channels following the matrix elements 72, 73, and 74 concern the invention as to detail of construction and operation.

Thus, briefly it may be seen that the color demodulators 79 and 80 are each suitably supplied with color subcarrier signals through quadrature signal supply circuits 87 and 88 from the amplifier 89 which, in turn, is connected through a signal supply circuit connection 90 with the 3.58 mc. local oscillator source 91 of subcarrier signals. This is indicated, at blocks 92 and 93, as being reactance controlled for stabilized frequency output in the usual manner, and the chrominance channel at the bandpass amplifier 78 is arranged to be cut off for black-and-white picture reproduction by suitable color-killer circuits indicated by the block 94.

The receiver system vertical and horizontal deflection signal supply and high-voltage circuits are readily adapted for use with the single-gun color picture tube 10 and its control circuits. As indicated by way of example along with the other conventional receiver circuits, these may include the usual horizontal and vertical oscillator circuits 96 and 97, respectively, with associated control circuits 98 and 99, and output circuits 100 and 101 for the horizontal sweep and vertical convergence operations of this as well as the conventional three-gun tube which it replaces.

For example, the horizontal deflection coil 17, in the yoke 19 of the tube 10, may be driven from the horizontal oscillator circuits 96 through the sweep output circuits 100 and a signal supply circuit connection therewith as indicated at 102. A corresponding signal supply connection for the vertical deflection coil 18 of the yoke 19 with the vertical oscillator circuits is indicated at 103. The normal high-voltage and focus-voltage sources 104 and 105 respectively provided in connection with the horizontal sweep circuit 100, may be suitably connected, as indicated by the supply circuit connections 106 and 107, to energize the respective ultor or second anode 47 at the terminal 48 and the focus anode 45 in the tube 10.

As indicated in connection with the high-voltage terminal 48, the second or screen grid 43 and the accelerating anode 44 may be energized through a bleeder-resistor circuit 108. The latter may include a voltage-dropping resistor section 109 in series to system ground 15 with a tapped voltage supply resistor section 110 for the two electrodal tap connections 112 and 113 therewith. A filter capacitor, as indicated at 114, may be included in the circuit between the resistor sections to smooth the applied voltages and further decouple the electrodes from the ultor supply source in this case.

The cathode heater 41 is connected with any suitable heater current source (not shown) in the receiver, and the cathode 40 is connected with conventional bias and control circuitry as indicated by the connection lead 118 and by the coupling circuit lead 119 to the vertical oscillator output. Convergence control potentials from the conventional sources as indicated are applied to the focusing electrode or anode 46 through a suitable connection indicated by the lead 120 in the present example. It should be noted that the common circuit return connection between the various blocks or elements of the circuit diagram may be considered to be through system ground indicated by the conventional symbol therefor and generally by the reference numeral 15 as above, and as first referenced in connection with FIG. 1.

The single-gun tube 10 is thus adapted to operate in connection with the normal voltage and current supply sources provided in a conventional color television receiver, and with the usual line and field, or horizontal and vertical, deflection signal sources in connection with the usual form of deflection yoke thereon, to produce a normal and accurate line-scanning pattern across the screen. Color signals in the three primary colors in the present example, or others in any particular system, and black-and-white signals in the absence of color components, are provided at the matrix output circuits such as the circuits 75, 76, and 77 described, as part of a representative receiver system for which the picture tube and control circuits of the present invention are adapted.

As described in connection with the operation of the picture tube 10, to produce the desired picture in color, the beam is caused to describe the undulating uniform-amplitude path 32 as shown in FIG. 2, at a relatively-high-frequency, across each scanning line and the three color stripes 22, 23, and 24 thereof, under control of deflection voltages applied to the deflection electrodes 38 and 39 from a suitable source of control signals or oscillations. The color signals to the electron gun, that is, to the control electrode or first grid 42 thereof, are gated or sampled in synchronism with the beam deflection in following the undulating path, and thereby producing the high-resolution pattern of variable-brightness dots or spots 33, 34, and 35 as described, and the improved picture reproduction desired.

Further in accordance with the invention, the color television system shown is provided with a limited number of control circuits related to the tube 10. These include a gate circuit or gate, one for each color channel, as indicated at 125, 126, and 127, connected respectively to receive the signal output from the color output channels or circuits 75, 76, and 77 of the receiver system and having respective output circuit leads 128, 129, and 130. The latter are connected together in a mixer circuit 131 at a common terminal 132 thereof, with system ground providing the common return circuit connection therefor. The mixer terminal 132 is variably coupled to apply the signal output to the signal input or beam-control grid 42 of the picture tube through a potentiometer resistor 133 connected to system ground at one end or terminal and connected to the grid at the opposite terminal through a coupling capacitor 134 and input circuit lead 135. Bias and control potentials are applied to the grid through a supply circuit indicated by the lead 136.

The gate circuits or gates 125, 126, and 127 and the beam deflecting electrodes or plates 38 and 39 are controlled to operate in synchronism, from a common source of high-frequency signals. These signals preferably are sine-wave or saw-tooth oscillations applied through a quadrature transformer 138 and gate signal circuit 139 which may in itself be the oscillation source. The quadrature transformer receives control signals, that is, the gating and deflecting signals, from the gate signal circuit 139 through a coupling circuit connection indicated at 140 and distributes these signals in out-of-phase relation, as indicated, to the three gate circuits 125, 126, and 127 through respective circuit connections indicated at 141, 142, and 143. The two deflecting plates 38 and 39 are connected with the quadrature transformer through control leads 144 and 145 respectively, in each of which are provided a series variable balancing-resistor 146 and a shunt-connected variable amplitude-control potentiometer 147, with the control contacts 148 connected, as indicated by the dotted line 149, for joint control in unison by a control knob 150 or the like.

The deflection frequency for the additional vertical beam deflection and gate switching should be relatively high in order to obtain good color spot distribution, as is readily apparent from a consideration of the number of scan lines and line lengths involved for each scan, being higher for the larger screen sizes, and limited only by the bandwidth of the channel, since the deflection signal component must be filtered from the gate output signals.

If the picture tube screen is of relatively small size, the 3.58 mc. signal from the subcarrier oscillator 91 may be used as the control signal for the deflection plates 38 and 39 and the gates 125, 126, and 127. In that case, the oscillator 91 is provided with an output circuit connection 146 with the gate signal circuit 139, which in turn merely provides a signal translating-through-connection with the circuit connection 140 to the quadrature transformer. If the tube is larger, that is, has a larger screen area, the gate signal circuit 139 may provide for frequency doubling as will be seen with reference to the circuit of FIG. 6, where the quadrature transformer is also shown in detail in connection therewith. In the event that the picture tube is extremely large, the gate signal circuit 139 may, in itself, provide the high-frequency signal source and operate at any desired higher frequency above the 7.12 mc. range, for example, and provide any desired wave shape or form in the output signal. A sine-wave or sinusoidal form is considered in the present example, as is understood.

Blanking signals, synchronized with the horizontal sweep operation, are applied to the gate circuits in parallel from a supply circuit 151 connected with the horizontal sweep circuit 100 in the system shown, and serve to control the gates in synchronism with the horizontal scanning as will be described.

Referring now to FIG. 6, the gate signal circuit 139 here provides a frequency-doubling connection between the oscillator 91 and the supply connection 140 to the quadrature transformer 138. A single screen-grid electronic tube 152 of any commercially-available type, having a signal-input or control-grid circuit 153, is coupled to the oscillator 91 through a capacitor 154 across an input grid resistor 155 to ground in the grid circuit. Bias is provided by the usual cathode resistor 156 suitably bypassed at signal frequencies by a shunt capacitor 157 and connected to ground 15. The screen grid circuit 158 is connected with a positive or +B supply lead 159 through a series supply resistor 160 and is bypassed to ground through a filter capacitor 161 in connection with the resistor 160.

The plate or output circuit 164 of the tube 152 includes the circuit connection 140 to the quadrature transformer 138 and a coupling or primary winding 165 therein, in addition to the tuning inductor 166 for the doubler circuit and a filter resistor 167 which is connected with the +B supply lead 159 or any suitable source of operating voltage. The supply connection is bypassed to ground through a filter capacitor 168. The tuning inductor is provided with a shunt tuning capacitor 169 and tuning adjustment means, such as a tuning core indicated at 170, for adjusting the output circuit tuning to 7.16 mc. in the present example, or double the oscillator or input signal frequency at the grid circuit 153.

The quadrature transformer 138 is provided with two secondary windings, 172 and 173, inductively coupled with the coupling or primary winding 165 for receiving the high-frequency signal output from the gate signal circuit 139. The secondary winding 172 is tuned by a shunt capacitor 174 and is loaded by a shunt resistor 175 for broad response to the applied signal frequency. It is connected with the gate control circuit 141 for the gate 125 and to the leads 144 and 145 for the tube deflection plates, to provide output signals to the gate 125 and the said plates in phase with the input signals at the primary winding 165. The output leads 143 from the quadrature transformer are connected with the secondary winding 172 in reverse or 180° out of phase with the leads 141, as indicated at the connection junctions 176 and 177 therewith. Thus the signals at the leads 143 for the gate 127 are 180° out of phase with the signals at the primary winding 165.

The secondary winding 173 is resistance loaded, as indicated by the shunt resistor 179, for broad response to the applied signal frequency and is substantially untuned. It provides signals at the output circuit connection 142 for the gate 126 out of phase 90° with respect to the signals at the primary winding 165. The gates are thus operated in the phase relation indicated. However, the gates may be operated all in phase, with suitable delays introduced in the output circuits from the gates to create the same effective phase differences at the output circuits 125–126–127.

Referring now to the gate circuit of FIG. 7, along with the circuits of FIGS. 5 and 6, it may be assumed, by way of example, that this is the circuit of the Green gate 125, since all three gate circuits are identical in construction and operation except for timing of the signal flow therethrough. Each gate circuit includes a control tube 182 which may be of the type known as a sheet-beam tube, in which the electron beam from a cathode 183 is deflected from one to the other of two output anodes 184 and 185 by deflection electrodes or plates 186 and 187, after passing an input or control grid 188, a focusing grid 189 and an accelerating grid 190, as schematically indicated. A tube known commercially as a 6AR8 sheet-beam tube is suitable for this use.

The control grid 188 is connected with the video signal output circuit from the color matrix circuit, which in this case is represented by the circuit lead 75, through a series current-limiting and isolating resistor 192 across the impedance of an input circuit resistor 193 and capacitor 194 in series to system ground 15. An input circuit connection for the blanking signal from one branch of the supply lead 149 is provided at the junction of the resistor 193 and the capacitor 194. The video signal input to the control grid is applied to the junction of the series and shunt-connected resistors of the input circuit. The blanking signal is applied to the grid across the impedance of the capacitor 194.

The sine-wave signal from the quadrature transformer 138 is applied to the deflecting plates 186 and 187 through the circuit connections 141 for the in-phase or 0° signal. When one plate 187 is positive, the electron flow from the cathode is deflected toward the anode 185. This is rendered inactive for signal translation by connecting the anode circuit lead 195 therefrom directly to the positive anode voltage supply source or B+ lead 196 through an anode resistor 197 without any output signal coupling thereto. A smoothing capacitor 198 connected to system ground 15 is provided for the B+ source or lead 196. The focusing grid 189 is connected to system ground, along with the heater, as indicated. The accelerating grid 190 is also connected with the B+ supply lead 196 through a variable or adjustable resistor means 199. This may be adjusted in balancing the signal output from the channel with respect to the other channels.

The second anode 184 receives the electron flow from the cathode as the other deflecting plate 186 becomes positive, the effective deflecting voltage on the plate 186 is reduced by a series resistor 200 in each gate circuit, whereby full deflection of the electron flow and signal current through the anode 184 is attained only during the positive signal peaks or upper third of the positive swing of the applied gating voltage. This resistor may be variable, as indicated, to insure a maximum sampling at each gating operation. The anode 184 is provided with signal output coupling through an output anode circuit 201 which include a series-connected output-coupling R-F choke coil 202 and output resistor 203, the latter being connected with the positive supply lead 196.

Video output signals for the output lead 128 are taken from an output terminal 204, across the impedance of coupling elements 202 and 203, and passed through the R-C network comprising the resistor 205 and shunt capacitor 206 in each gate circuit. A trap circuit 208 for the gating signal, the 7.16 mc. sine-wave in this case, is provided in shunt relation to the video output circuit. This comprises a series-connected tuning capacitor 209 and tuning inductor 210 between a terminal 211 on the output circuit 128 and system ground 15. This trap circuit in each gate is tuned to effectively remove the gating signal from the output to the picture tube as applied to the mixer circuit 131.

Considering the receiving system of FIG. 5 provided with a gate signal circuit 139 and quadrature transformer 138 constructed and connected as shown in FIG. 6, and controlling three gate circuits at 125, 126, and 127 as shown and described in connection with FIG. 7, the operation is as follows:

Sine-wave gating signals pass through the quadrature transformer 138 into the sheet-beam tube of each of the gates 125, 126 and 127. The first tube in the gate 125 operates in phase with the oscillator or gating signals from the source. The second tube in the gate 126 operates 90° out of phase with the gating signal, and the third tube in the gate 127 operates 180° out of phase with the gating signals, substantially in the relation shown in FIG. 8(*a*) where 143A, 142A, and 141A represent the sine-wave gating signals applied to the gates through the supply circuits 143, 142, and 141, respectively, from the quadrature transformer 138.

The series resistors 200 in each gate circuit limit the amplitude of the signal applied to the deflecting plate 186 which controls the signal output anode 184, whereby the signal control provided by the video signal on the control grid 185 is sampled only during the peaks or most positive parts of the wave form or sine-wave cycle of the displaced gating signal components represented at 143A, 142A, and 141A in FIG. 8(*a*), where G, B, and R designate the green, blue, and red portions of each cycle which may cause a sampling of the corresponding input signal from the matrix circuit.

The pulse forms or waves 128A, 129A, and 130A in FIG. 8(*b*) represent the signal output voltages which are applied through the output circuits 128, 129, and 130, respectively, to the mixer 131 and to the control or signal grid 42 of the picture tube 10. These are a series of three pulses with amplitudes which vary and normally correspond to the color information for each color stripe on the tube screen. A space or blank 215 appears between each series, one pulse wide, and corresponding to a 270° controlling sine-wave which cannot be applied, due to the beams position back over the 90° color element 23 of the scan line, and thus resulting in a zero-amplitude pulse. With sine-wave signals, as here, all sampling occurs between 0° and 180° since the remainder from 180° to 360° is retrace. Other control signals, such as saw-tooth waves would have a different phase relationship in the sampling steps due to the wave shape.

In a similar manner, as represented in FIG. 2, the showing in FIG. 8(*c*) is with one scan line oriented in phase relation to sections (*a*) and (*b*) to indicate that as one gate such as the green gate samples the input signal, the electron beam, as at 33, is on the first color stripe 22. As the second gate, such as the blue gate, samples the input signal, the electron beam, as at 34, is on the second color stripe 23. As the third gate, such as the red gate, samples the input signal, the electron beam, as at 35, is on the third color stripe 24. Since there is no fourth gate and no 270° control signal, the second stripe 23 is not stimulated as the beam returns to the first stripe 22. Since the gating signal is also applied to the deflecting plates 38 and 39 of the picture tube through the quadrature transformer from the same signal source, they are always in synchronism. However, either the gate output signals or the control signals on the deflecting plates of the picture tube must be adjusted to insure synchronism.

It may be noted that here again, for different numbers of sampled signals and stripes in each scan line, the phase relation will differ. Also the scanning beam is centered by adjusting the two elements 146 in the supply leads 144 and 145 to the deflecting plates, and the beam is caused to undulate between the limits of the line and across all luminescent stripes without overlap, by adjusting the two amplitude control elements 148. The color information through each channel is balanced against the others by the control elements 199 (FIG. 7) in the present example, and the peak sampling is set by the control elements 200 in each channel. Furthermore, if the gates operate in synchronism, the phase relation desired can be obtained by suitable delay networks at as each output circuits 128, 129, and 130.

From the foregoing consideration of the invention and in its application to color television receiving systems, it will be seen that an improved cathode-ray color television picture tube of the single-gun or single-beam type is provided thereby, together with effective control and gating circuits that avoid beam nonlinearity and like problems and admit of a simplified low-cost tube structure with ready adaptation to conventional signal and operating-voltage supply sources.

Furthermore, by combining a line-sequential mode of operation with dot-sequential modifications, improved picture development and definition is made possible with a single-beam color picture tube.

I claim:

1. In a color television signal receiving system, a cathode-ray picture tube of the single-gun type and control means therefor for color picture reproduction, said picture tube having an image screen providing a plurality of scanning lines in spaced parallel relation, each line comprising spaced parallel color stripes responsive to beam activation to emit all colors involved in a color picture transmission to be reproduced, said control means providing tube and circuit elements connected for effecting line-sequential scanning of said screen, with a single beam of less than scanning line width in a high-frequency oscillatory path across each line in a dot-sequential configuration and in synchronism with color signal information applied to the beam at each stripe, said tube elements including a pair of beam-deflecting electrodes along the beam path and a signal input electrode for modulating the beam, and said circuit elements including a plurality of color channels and color gates connected one in each color channel to apply color signal information to said input electrode in successive-phase quadrature relation in response to high-frequency deflection signals applied to said beam reflecting electrodes, a quadrature transformer provided to jointly control said color gates and said deflection electrodes and including a signal input winding and a plurality of signal output windings, one of said output windings providing in-phase signals to a first one of said gates and said deflection electrodes and 180° out-of-phase signals to a third one of said gates, and another of said output windings providing 90° out-of-phase signals to a second one of said gates, and a source of high-frequency oscillations connected to the signal input winding of said quadrature transformer, thereby to provide gating and beam-deflecting signals in synchronism.

2. In a color television receiving system, the combination as defined in claim 1, wherein the scan lines on the screen are defined by interposed relatively-wide spacing bands of inert masking material, and wherein the parallel color bands in each scan line of the screen are separated by relatively-narrow line elements of inert masking material.

3. In a color television receiving system, a cathode-ray picture tube of the single-gun type and control means therefor for color picture reproduction, said picture tube having an image screen providing a plurality of scanning lines in spaced parallel relation, each line comprising spaced parallel color stripes responsive to beam activation to emit all colors involved in a color picture transmission to be reproduced, said control means providing tube and circuit elements connected for effecting line-sequential scanning of said screen, with a single beam of less than scanning line width in a high-frequency oscillatory path across each line in a dot-sequential configuration and in synchronism with color signal information applied to the beam at each stripe, said tube elements including a pair of beam-deflecting electrodes along the beam path and a signal input electrode for modulating the beam, and said circuit elements including a plurality of color channels and color gates connected one in each color channel to apply color signal information to said input electrode in successive phase-quadrature relation in response to high-frequency deflection signals applied to said beam deflecting electrodes, the scanning lines being defined by interposed spacing bands of blanking material and the color bands of each line being separated by line elements of like material, and said line elements being increased in width and said spacing bands being decreased in width progressively from the center of the screen toward the more remote boundaries thereof to spread the color bands and maintain the scanning lines in the same relative positions at said boundaries.

4. In a color television signal receiving system, the combination of, a cathode-ray picture tube having an image screen of luminescent beam-activated material and means responsive to horizontal and vertical scanning signals provided by said system for projecting and directing a single scanning beam in a multi-line pattern across said screen, said screen having scan lines defined thereon according to said multi-line pattern and responsive to the beam trace for emission each in more than one color along parallel narrow bands therein of substantially equal width, control means providing a high-frequency vertical scanning movement in the beam deflection along each scan line to select different color bands therein for spot activation, said control means including a pair of beam-deflecting electrodes in the picture tube and a source of high-frequency control signal, of uniform amplitude connected therewith, and means for synchronizing the beam position in each line with color information signals applied to said tube from said system, said last-named means including a beam modulating electrode in the picture tube, a plurality of color gates connected with said electrode to apply said color information signals thereto and modulate the scanning beam in accordance therewith, a sheet-beam tube in each gate having a pair of beam-control electrodes, and quadrature transformer means having a signal input winding connected with said source of high-frequency control signals and at least two secondary windings a first one of which is connected with the picture-tube beam deflecting electrodes and the beam control electrodes of a first of said color gates for high-frequency control signal application thereto in in-phase relation, and a second one of which is connected with the beam-control electrodes of the second and third of said color gates for high-frequency signal application thereto in progressive quadrature phase relation between the first and second and the second and third color gates, thereby to progressively sample the color information through each gate in synchronism with the beam deflection across said scan lines.

5. In a color television receiving system, the combination as defined in claim 4, wherein the gating of signals through said gates is confined to the peak portions of the applied control signal waves by a limiting element in circuit with one of said beam control electrodes in each gate, and wherein means are provided for adjusting the amplitudes of the control signal waves applied to the beam-deflecting electrodes in the picture tube.

6. In a color television receiving system, the combination as defined in claim 4, wherein the sheet-beam tube in each gate is provided with an accelerating electrode, and wherein means are connected with said accelerating electrode for applying a variable biasing potential thereto for changing the signal gain through the gate and the output level for each color component applied to the beam control electrode of the picture tube.

References Cited

UNITED STATES PATENTS

| | | | |
|---|---|---|---|
| 2,274,124 | 2/1942 | Bowley | 333—77 X |
| 2,809,233 | 10/1957 | Keizer | 178—5.4 |
| 2,910,581 | 10/1959 | Richman | 178—5.4 |
| 2,953,634 | 9/1960 | Court | 178—5.4 |
| 3,147,340 | 9/1964 | Ehrich | 178—5.4 |

JOHN W. CALDWELL, *Primary Examiner.*

DAVID G. REDINBAUGH, ROBERT L. GRIFFIN, *Examiners.*

J. O'BRIEN, *Assistant Examiner.*